United States Patent [19]

Arnold et al.

[11] 4,218,641
[45] Aug. 19, 1980

[54] ANALOG DC MOTOR VELOCITY CONTROL LOOP

[75] Inventors: Robert W. Arnold, Glen Aubrey; Louis V. Galetto, Endicott, both of N.Y.

[73] Assignee: International Business Machines Corporation, Armonk, N.Y.

[21] Appl. No.: 961,321

[22] Filed: Nov. 16, 1978

[51] Int. Cl.$^2$ ............................................. H02P 5/16
[52] U.S. Cl. .................................. 318/341; 318/327; 318/464
[58] Field of Search ............... 318/327, 328, 341, 331, 318/264, 272, 430, 450, 459, 3 M, 464; 323/22 T, 40

[56] References Cited

U.S. PATENT DOCUMENTS

| | | | |
|---|---|---|---|
| 3,241,023 | 3/1966 | Eby | 318/314 |
| 3,409,814 | 11/1948 | Azuma et al. | 318/327 |
| 3,531,704 | 9/1970 | Uemura et al. | 318/328 |
| 3,596,162 | 7/1971 | Takayama | 318/327 |
| 3,740,633 | 6/1973 | Buttafauff | 318/328 |
| 3,753,067 | 8/1973 | Milligan | 318/314 |
| 4,024,445 | 5/1977 | Tokuda et al. | 318/318 |

*Primary Examiner*—David Smith, Jr.
*Attorney, Agent, or Firm*—John S. Gasper

[57] ABSTRACT

A pulse width modulated DC motor control system is designed to operate a DC motor at constant velocity. Feedback pulses generated at a rate proportional to the rotational velocity of the motor are converted to control pulses having a fixed on-time period which is independent of changes in the velocity of the motor. The control pulses are used to modulate a constant current source whose output is integrated to generate a sawtooth voltage signal whose average DC value is used as the basis of or pulse width modulating a DC voltage applied to the motor drive circuits of a DC motor.

3 Claims, 5 Drawing Figures

ANALOG DC MOTOR VELOCITY CONTROL LOOP

BACKGROUND OF THE INVENTION

1. Field of the Invention

This invention relates to the regulation of the velocity of electric motors and especially to a control system for operating a DC electric motor at a constant velocity under variable loading conditions.

2. Discussion of Prior Art

Many applications for electric motors require that the motor be operated at a constant velocity notwithstanding changes in the loading of the motor. One particular application involves recording of visible information on a record medium such as electrically-sensitive paper. In such recording devices an electrode in contact with the electrically-sensitive paper is activated to produce marks on the paper while the electrode is moved at a constant velocity over the surface of the paper. During the recording operation the relative motion between the recording element and the paper must be maintained constant although the recording operation may impose variable loading conditions on the drive motors. To avoid distortion of the visible information the constant relative velocity between the record medium and the recording elements must be maintained over all or an extended portion of the length of the recording medium notwithstanding the variability of the loading conditions.

Various systems for achieving this constant velocity as well as for other constant velocity applications have been devised. It is well known is such systems to generate a feedback signal in conjunction with the operating of the motor which represents the actual velocity of the motor. The velocity indicating feedback signal is compared with a reference signal of basically the same kind which represents the desired velocity of the motor. The comparison is made between the feedback signal and the reference signal to produce control pulses which operate a power source which applies energy to drive the motor. If the feedback signals vary from a predetermined standard as represented by the reference signal, correction is made to vary the power source to increase or decrease in accordance with the change in velocity.

Examples of motor velocity control systems which use a reference signal are shown in U.S. Pat. No. 3,753,067 issued Aug. 14, 1973 and U.S. Pat. No. 3,241,023 issued Mar. 15, 1966. In both patents the reference signal is provided by an external signal generator which operates at very precisely defined parameters. Such reference signal sources represent a substantial cost item in the total cost of the velocity control system. Likewise, the precision of the reference signal source tends to vary over extended time.

SUMMARY OF THE INVENTION

It is the principal object of this invention to provide an improved motor velocity control system which eliminates the need for an external reference signal source.

It is a further object of this invention to provide a motor control system which is built very easily from relatively inexpensive integrated circuit type technology.

Basically this invention achieves the above as well as other objects by using a means which derives a reference signal parameter directly from the feedback signal. In this manner the external signal generator is not required. In the preferred embodiment of the invention an emitter is connected for operation by the DC motor to generate a continuous stream of time-varying pulses. The frequency rate of the time-varying pulses represents motor speed. The emitter pulses operate a single shot which switches a DC current source to generate a control signal whose on-time per cycle is always fixed but whose off-time cycle is variable in accordance with the speed of the motor. The DC control signal is then integrated to produce a motor drive signal having a pulse width modulated in accordance with the on-off time intervals of the control signal.

Thus, in the practice of this invention the need for an external reference signal source is not required. In addition, correlation in the timing of the velocity signal source with the phase and/or amplitudes of the reference signal is not required. The direct conversion of the velocity dependent time-varying signal to produce a fixed on-time interval has greatly simplified the manner of producing the reference base for controlling the motor velocity. Furthermore, in accordance with this invention, the use of current sources and single shots readily afford implementation using integrated circuit devices which can be manufactured and configured at relatively small cost.

The foregoing and other objects, features and advantages of the invention will be apparent from the following more particular description of a preferred embodiment of the invention, as illustrated in the accompanying drawings.

DESCRIPTION

Figure 1:
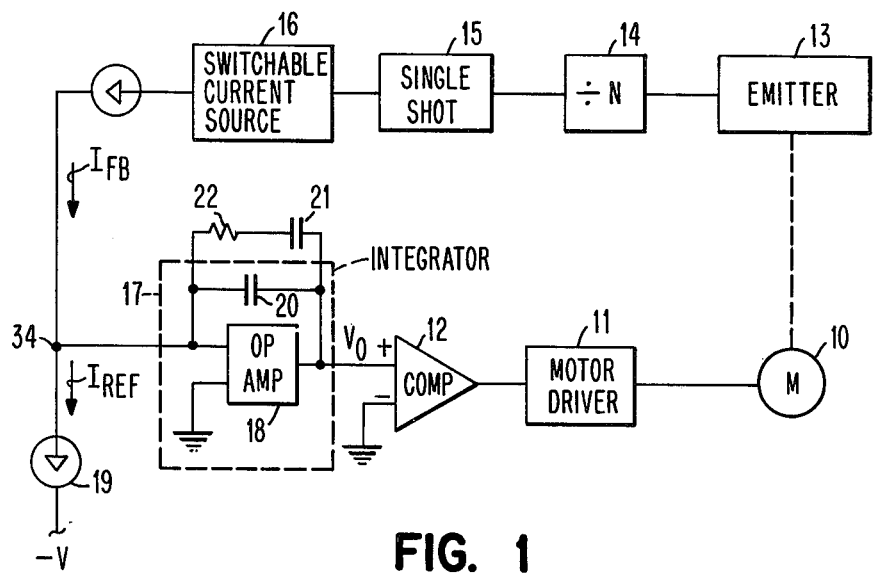
FIG. 1 is a schematic circuit diagram showing the feedback loop and motor control elements which incorporate the features of the invention in its preferred embodiment.

As seen in FIG. 1 the DC motor 10 is operated by driver circuits 11 connected in well-known manner to the armature of the motor. Details of the driver circuits are not shown since various circuit drivers using transistors are well-known. One such arrangement would utilize PNP and NPN transistors arranged in a bridge configuration which would function to apply current to the armature through various combinations of the transistors in the bridge circuit to control direction as well as speed. In any event, the drive pulses for energizing the driver circuits 11 for operating motor 10 are obtained from a power source such as comparator 12 whose specific function is to apply voltage pulses of fixed amplitude but of controlled width for drive signal pulses such as shown by curve 77 of FIG. 3.

The generation of the drive pulses 77 is regulated by a feedback loop which includes optical emitter 13 operatively connected to be driven by the rotation of the drive shaft of motor 10. While an optical emitter is specified, other emitters could be used which operate to produce a uniformly varying timing signal which has a frequency which is proportional the motor velocity.

Feedback signals from optical emitter 13 are fed through a divide by N circuit 14 which in effect counts a predetermined number of pulses from optical emitter 13. When the desired number of pulses have been received by circuit 14, an output control pulse signal is applied to single shot 15.

It is a feature of this invention that the standard or reference signal for determining a deviation from a desired velocity is derived directly from the feedback signal without regard to an external reference source and notwithstanding the fact that the feedback signal is also generated at the frequency proportional to the actual velocity of motor 10. For that purpose, the output of the divide by N circuit 14 is connected to a monostable circuit device such as single shot 15. A pulse from circuit 14 operates to turn ON single shot 15 which then remains ON for a precisely-timed fixed interval which is independent of the frequency of the pulses from emitter 13 and circuit 14. Thus, the ON time interval of single shot 15 is fixed for each operating cycle of the timing pulses generated by emitter 13 and divide by N circuit 14. The OFF time interval of single shot 15 during the period of motor operation, however, is a variable which is dependent on the frequency rate of the timing pulses from circuit 14 and emitter 13.

While in the preferred embodiment of the invention the ON time interval of the single shot 15 is the fixed reference interval, the OFF time portion could be fixed and alternatively could be used as the reference interval. Therefore, it will be understood in the description and claims that the term ON time interval includes the converse.

The ON time interval in accordance with the preferred embodiment for practicing of the invention, has a length set at a fixed fraction of the period of the pulses from divide by N circuit 14 when the motor is operated at the desired constant velocity. While the ON time interval of single shot 15 selected can be various, the preferred length is approximately half the period of the pulses from circuit 14 when the motor is operated at the desired constant velocity.

Figure 2:
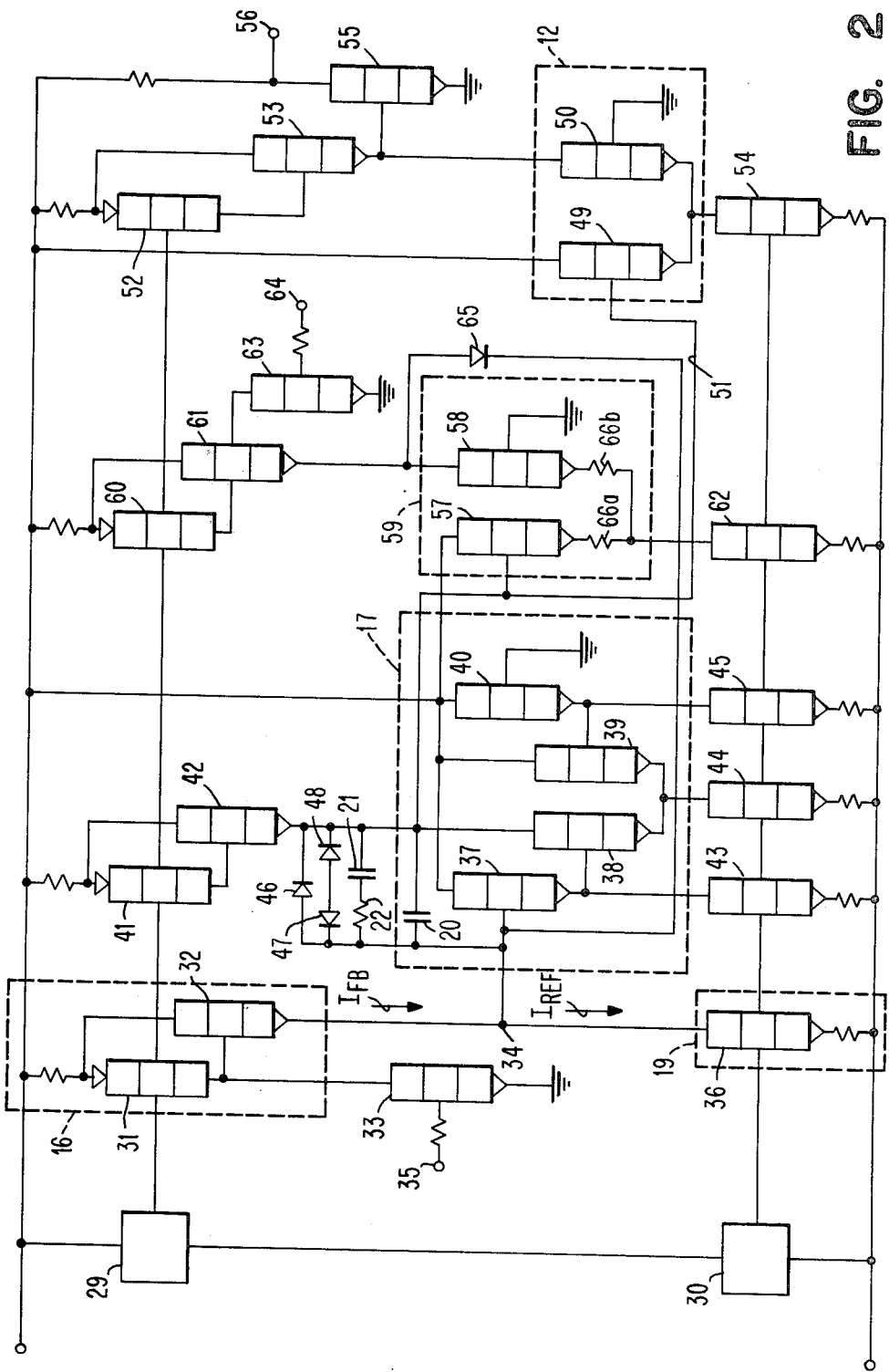
FIG. 2 is a detail circuit diagram of the control signal integrator and power source portions of the schematic diagram of FIG. 1.

The output signal from single shot 15 is applied to a switchable current source 16 which is connected at junction 34 with a reference current source 19 to the input of operational amplifier 18 which in conjunction with capacitor 20 form at integrator 17 for the currents $I_{FB}$ and $I_{REF}$. Capacitor 21 and resistor 22 provide a zero-pole for loop compensation which guarantees loop stabilization. A voltage signal $V_0$ from the integrator 17 is applied to a comparator circuit 12 which in turn generates the drive signal curve 77 of FIG. 3. A specific circuit design for the motor control of FIG. 1 is shown in FIG. 2. Blocks 29 & 30 are connected to provide a reference for the PNP & NPN current sources in order to track equally for power supply variations. In that figure transistors 31 and 32 make up the switchable current source 16 which when gated on by transistor 33 produces a DC current $I_{FB}$ at junction 34. Transistor 33 receives pulses at terminal 35 from single shot 15 (see FIG. 1) of the type shown by curve 69 in FIG. 3. Transistor 36 serves as the negative current source 19 which produces the DC current $I_{REF}$ at junction 34.

Operational amplifier 18 of integrator 17 comprises transistors 37, 38, 39 and 40 connected in the configuration of a Darlington differential amplifier. Transistors 41, 42, 43, 44 and 45 provide the desired biasing current sources. In the preferred embodiment this operational amplifier stage is biased at 10 times that of $I_{REF}$ or $I_{FB}$ so that the offset of the stage is minimized. Diodes 46, 47 and 48 are provided to keep integrator 17 linear and out of saturation or cutoff.

Transistors 49 and 50 form a differential amplifier front end for the comparator 12 which converts the ripple signal on line 51 from integrator 17 to pulse width modulated drive signals to motor 10 (see FIG. 1) at terminal 56. Transistors 52, 53 and 54 serve as current sources to bias comparator 12 and transistor 55 provides the logic output to the motor driver circuits 11 (FIG. 1) at terminal 56.

Transistors 57 and 58 form a differential amplifier 59 which along with the biasing current sources of transistors 60, 61 and 62 form a motor reset stage. During reset transistor 63 gates a $\overline{\text{RESET}}$ pulse at terminal 64 to supply current in opposition to $I_{REF}$. This holds the integrator 17 output on line 51 at ground when motor 10 is reversing or stopping. During reversing or stopping, the feedback loop is open, for example, by holding the divide by N counter 14 (see FIG. 1) reset which applies a pulse to terminal 35 of gate transistor 33. In this mode, differential amplifier 59 is turned ON by a $\overline{\text{RESET}}$ pulse at terminal 64 to transistor 63. Diode 65 permits the motor reset stage to provide current in only one direction into integrator 17 which is equal and opposite to $I_{REF}$. When a RESET pulse at terminal 64 is positive, transistors 60 and 61 are OFF and all current in the reset stage flows through transistor 63 to ground and no drive can be supplied through diode 65 and the reset stage is inoperative. If a $\overline{\text{RESET}}$ pulse is applied at terminal 64, current flows through transistor 61 causing differential amplifier 59 to try to force the integrator 17 output to zero volts. When the zero voltage level is reached, the current flowing through diode 65 is equal to $I_{REF}$. At this point that the integrator 17 is reset the differential amplifier 59 is balanced with the current in transistor 58 equal to the current in transistor 57. The stability of the loop is determined by the loop gain consisting of the integrator 17 and the integrator reset differential amplifier 59. Resistors 66a and 66b control the loop gain and band width of the reset stage. They are chosen to keep the band width of the loop below that of the integrator 17 itself to insure adequate phase margin.

Figure 3:
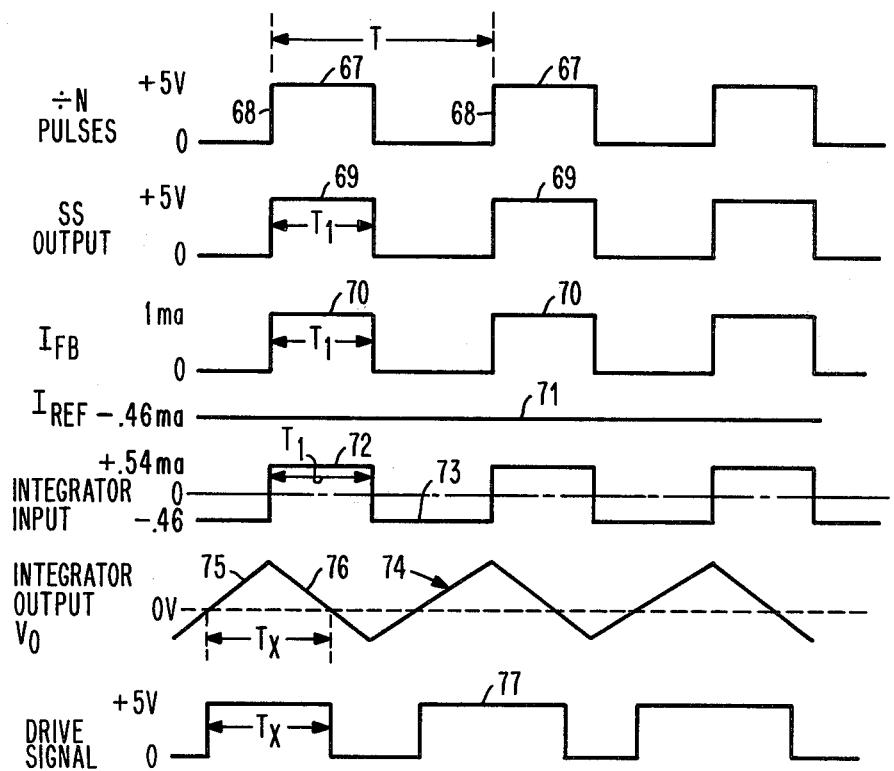
FIGS. 3-5 are timing charts showing the various control and motor drive signals generated by the elements of the velocity control system described in FIGS. 1 and 2.

The motor control system operates as follows:

Emitter 13 connected to the shaft of motor 10 generates feedback timing signals at a frequency which is a function of the actual velocity of the motor. These feedback timing signals are converted by the divide by N circuit 14 to produce a train of binary control pulses 67 as shown in FIG. 3. The binary control pulses 67 are square wave voltage pulses having uniform ON-OFF time intervals. The period of these pulses is defined by the expression $T = 2\pi N/\omega_o$ where $\omega_o$ is the motor shaft rotational velocity in radians per second. The binary voltage pulses 67 from divide by N circuit 14 are applied to a single shot 15 which is turned on by each leading edge 68 of pulses 67. The ON time interval $T_1$ of pulses 69 from single shot 15 is fixed regardless of the period T of pulses 67. This ON time interval $T_1$ is selected to be a fixed fraction, i.e. approximately one-half of the period of the single shot pulses 69 occurring at the desired motor velocity. The period of the train of pulses 69 from single shot 15 is the same as the period of the pulses 67 from the divide by N circuit 14. Since the ON time interval $T_1$ is fixed, the OFF time interval for single shot 15 will vary dependent on the period T of the pulses from divide by N circuit 14 which are a function of the speed of motor 10. Feedback pulses 69 from single shot 15 are applied to the switchable current source 16 to produce analog current control pulses $I_{FB}$ 70.

While $T_1$ is shown in the preferred embodiment to be approximately $\frac{1}{2}$ T, $T_1$ could be a fraction greater or less than $\frac{1}{2}$ T. The selection of $T_1$ is largely a matter of choice determined according to the following expression $$\omega_o = \frac{2\pi\ N}{T_1(1 + \frac{I_{FB}}{I_{REF}})}$$

A practical range for $T_1$ is represented by the following expression $$0.3T \leq T_1 \leq 0.7T$$

The analog current control pulses 70 occur at the same frequency as the binary feedback pulses of single shot 15. In the preferred embodiment, the current control pulses 70 are positive pulses with an ON time interval $T_1$ applicable to the input of the integrator 7 at terminal 34 which is also connected to a DC current source 19 which produces a negative $I_{REF}$ 71 of constant value. The input control signal to integrator 17 at junction 34 consists of a positive current pulse 72 for time $T_1$ and a negative pulse 73 for the remainder of the period of single shot 15. Thus the current control pulses 72 & 73 occur at a frequency which is a function of the actual velocity of the motor 10; however, the positive ON time $T_1$ *is always fixed and serves as the reference interval which is a function of motor speed at the desired velocity.*

Figure 4:
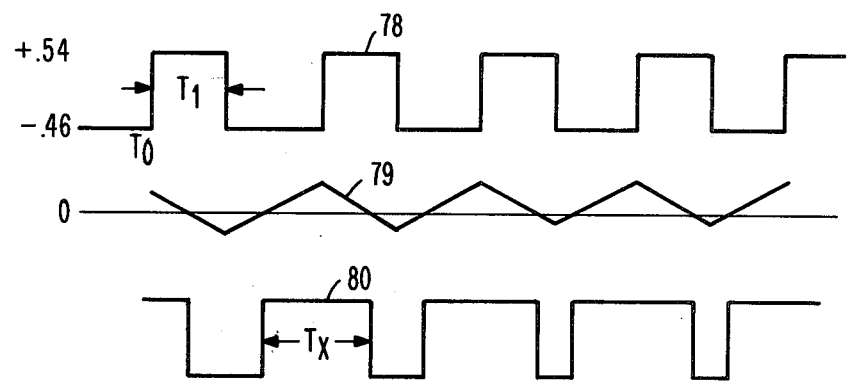
Figure 5:
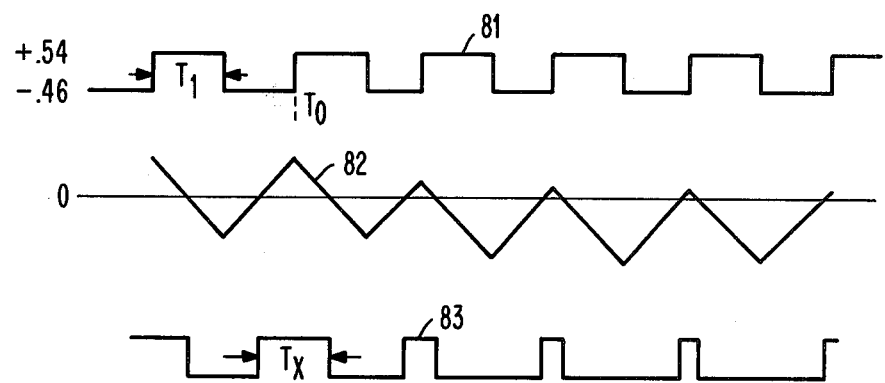

Integrator 17 converts current control pulses 72 and 73 to a ramping output voltage 74 having a positive going ramp 75 when negative current control pulse 73 is ON and a negative going ramp 76 when the positive current control pulse 72 is ON. Comparator 12 converts the ramping voltage output 74 from integrator 17 to pulse width modulated drive pulses 77. The width $T_X$ of the drive pulses 77 produced by comparator 12 is determined by the time between the points of cross-over of ramp 75 and 76 relative to an analog reference voltage, for example, zero volts. Comparator 12 converts the output ramping voltage 74 into an output pulse 77 which has a pulse width $T_X$ proportional to its average value. If the motor speed is too low, i.e., the load increases, there are not enough $I_{FB}$ feedback pulses 70 to cancel out $I_{REF}$ and the average value of the integrator output rises positive relative to the fixed reference voltage increasing the pulse width $T_X$. Curves 78, 79 and 80 of FIG. 4 show the current control pulses, integrator ramp output voltage, and the drive pulses respectively for the increased load condition such that TX varies until the increased load is corrected to the actual desired motor velocity. If the motor speed is too high i.e. the load decreases, feedback current pulses $I_{FB}$ cancel out $I_{REF}$ to a greater degree and the average value of the integrator ramping voltage drops negative thereby decreasing the pulse width $T_X$. Curves 81, 82 and 83 in FIG. 5 show the current control pulses, the integrator ramp output voltage and the drive pulses respectively where motor speed increases upon decreased load and is returned to desired speed.

Therefore, a motor control system for maintaining a DC motor at a constant velocity has been described which eliminates the need for an independent reference signal source against which signals generated in a feedback system by the operation of the motor is eliminated. In the system described the feedback signals are themselves converted to a control signal which includes a reference interval of fixed time duration which is the standard or reference for determining changes in the motor velocity and for making the necessary speed corrections to maintain the velocity constant under varying load conditions.

While the invention has been particularly shown and described with reference to a preferred embodiment thereof, it will be understood by those skilled in the art that various changes in form and details may be made therein without departing from the spirit and scope of the invention.

Having thus described my invention, what I claim as new, and desire to secure by Letters Patent is:

1. A velocity control system for a DC motor comprising:
   a source of DC voltage drive pulses applicable to drive said motor;
   means for controlling said source for maintaining the velocity of said DC motor substantially constant under variable loading conditions including,
   a feedback loop connected to modulate the duty cycle of said drive pulses provided by said source to said motor,
   said feedback loop including means for producing digital feedback control pulses at a frequency proportional to the acutal velocity of said motor,
   said digital control pulses having a reference interval of fixed time duration independent of the frequency of said control pulses; and
   analog circuit means operable by said feedback control pulses for controlling the duty cycle of said drive pulse in accordance with the relative proportion of said reference interval and the period of said digital control pulses at the actual velocity including
   a first current source providing a constant DC reference current,
   a second current source switchable by said digital control pulses for providing a DC feedback current of fixed time duration correspondong to the reference interval of said binary control pulse;
   said reference and feedback currents having opposite polarities and different amplitudes whereby a binary current signal is provided,
   integrating means for converting said binary current signal to a sawtooth voltage signal which oscillates relative to a fixed DC reference voltage,
   said sawtooth signal having one ramp of fixed slope and duration as a result of the integration of said binary current signal having said fixed time duration, and
   means for modulating the width of said DC voltage drive pulses applied to said motor in accordance with the interval between crossovers of said sawtooth voltage signal and said reference DC voltage.

2. A velocity control system for a DC motor in accordance with claim 1 in which,
   said reference and feedback currents are negative and positive DC currents respectively.

3. A velocity control system for a DC motor in accordance with claim 2 in which,
   said reference interval of said digital feedback control pulses is approximately one-half the period of said control pulses at the desired motor velocity, and
   the amplitude of said feedback current is approximately twice the amplitude of said reference current.

* * * * *